United States Patent [19]
Kazakoff

[11] Patent Number: 5,574,551
[45] Date of Patent: Nov. 12, 1996

[54] PRINT MEDIA SUPPLY APPARATUS WITH MEDIA PARAMETER DETECTION CAPABILITY

[75] Inventor: James A. Kazakoff, Boise, Id.

[73] Assignee: Hewlett-Packard Company, Palo Alto, Calif.

[21] Appl. No.: 247,942

[22] Filed: May 24, 1994

[51] Int. Cl.$^6$ ................................................. G03G 21/00
[52] U.S. Cl. ......................... 399/45; 271/171; 399/23
[58] Field of Search ......................... 355/311, 309, 355/75; 271/171, 164, 223, 241, 144, 265.02

[56] References Cited

U.S. PATENT DOCUMENTS

| | | | |
|---|---|---|---|
| 3,689,143 | 9/1972 | Case et al. | 355/311 X |
| 4,740,811 | 4/1988 | Watanabe | 355/311 X |
| 4,780,740 | 10/1988 | Fukae | 271/171 X |
| 4,920,384 | 4/1990 | Okamoto | 355/311 |
| 5,036,354 | 7/1991 | Miyamoto | 355/311 X |
| 5,110,106 | 5/1992 | Matsumura et al. | 271/171 X |
| 5,313,257 | 5/1994 | Kashima et al. | 355/309 |
| 5,360,207 | 11/1994 | Rauen et al. | 271/265.02 |

*Primary Examiner*—Arthur T. Grimley
*Assistant Examiner*—Shuk Y. Lee

[57] ABSTRACT

In hard copy machines, automatic detection of the size of print media in a supply bin is provided by electrical devices. Adjustable print media alignment fences are operatively connected to the electrical devices, such as potentiometers, photovoltaic strips, photoemitter-photodetector arrays, or the like. The output signals from the electrical devices are correlated to width and length dimensions of the print media or the absence of print media availability. Embodiments are disclosed for standard and custom print media size detection.

17 Claims, 5 Drawing Sheets

PRINT MEDIA SUPPLY APPARATUS WITH MEDIA PARAMETER DETECTION CAPABILITY

FIELD OF THE INVENTION

The present invention relates generally to hard copy machines, more particularly to print media supply devices for printers, plotters, copiers, and the like, and, more specifically to a print media supply apparatus with print media parameter detection capability.

BACKGROUND OF THE INVENTION

In the state of the art, computer printers and plotters and photocopiers generally allow the use of different forms of hard copy print media such as cut sheets of paper in standard size (8.5×11 inches), legal size (8.5×14 inches), extended size (8.5×17 inches), A4 size (metric), or envelopes of varying dimensions, and the like.

It is common for the manufacturers to equip for different sizes of print media by providing changeable media supply capability such as adjustable trays, multiple bins, or interchangeable media cassettes adapted for each different size of print medium. Thus, it is common for the manufacturer to provide several cassettes, trays or storage bins for different sized print media which the user must select from the control panel or manually change for each particular print job. Some machines provide limited automation in that datums, or other mechanical interface features of the cassette, provide indicators that the correct cassette has been inserted to match the user's request for a particularly sized hard copy.

Some trays and cassettes are provided with sliding guides that are manually closed about a stack of print media in one or two directions in order to align the individual sheets of the stack. These guides may be used to adjust a cassette to more than one size of print media. For example, because of the very slight dimensional difference between standard U.S. paper (8.5×11 inches) and the metric A4 size (8.27×11.69 inches), a cassette may be adapted for use with both papers by providing adjustable width guides.

Still, whenever a change in print media size is required, the user must take time to change a cassette or, using a manufacturer supplied control panel, select the appropriate tray or bin having the print media of the size matching the user's need.

Standard cassette designs either do not allow automatic machine detection of the print media dimensions or can only utilize a small sub-set of print media sizes because the print media size detection is done using fixed position switches or detection devices.

Therefore, there is a need for a more universal apparatus for holding print media of various surface area linear dimensions (length×width) and automatic detection of those dimensions.

SUMMARY OF THE INVENTION

In its basic aspect, the present invention uses electrical feedback from a print media supply apparatus in conjunction with stored information on media size to inform a print engine of a hard copy machine of the dimensions of the print media. A print media holding mechanism is cooperatively engaged with an electrical signal generating device. Print media dimensions are correlated to the generated signals. The print engine controller or host computer of the hard copy machine is automatically adapted to the recognized print media dimensions.

It is an advantage of the present invention that it provides the measurement of surface area linear dimensions of print media loaded into a media containment mechanism.

It is an advantage of the present invention that it allows a hard copy machine print engine to detect the size of print media loaded in a media supply holder used in conjunction with the machine.

It is another advantage of the present invention that it allows for a universal print media supply cassette, accepting different size media.

It is another advantage of the present invention that it permits custom print media sizes to be used in a hard copy machine.

It is yet another advantage of the present invention that it allows the same print media cassette to be used for various print engines.

It is still another advantage of the present invention that measurement of the size of the provided print media allows feedback of this information to a host computer system for validation or automatic selection of print media and media format settings, for example, print region margins.

It is a further advantage of the present invention that it alleviates the necessity of user intervention to select print media size.

Other objects, features and advantages of the present invention will become apparent upon consideration of the following detailed description and the accompanying drawings, in which like reference designations represent like features throughout the FIGURES.

3

The drawings referred to in this description should be understood as not being drawn to scale except if specifically noted.

DETAILED DESCRIPTION OF THE INVENTIONS

Reference is made now in detail to a specific embodiment of the present invention, which illustrates the best mode presently contemplated by the inventor(s) for practicing the invention. Alternative embodiments are also briefly described as applicable.

Figure 1:
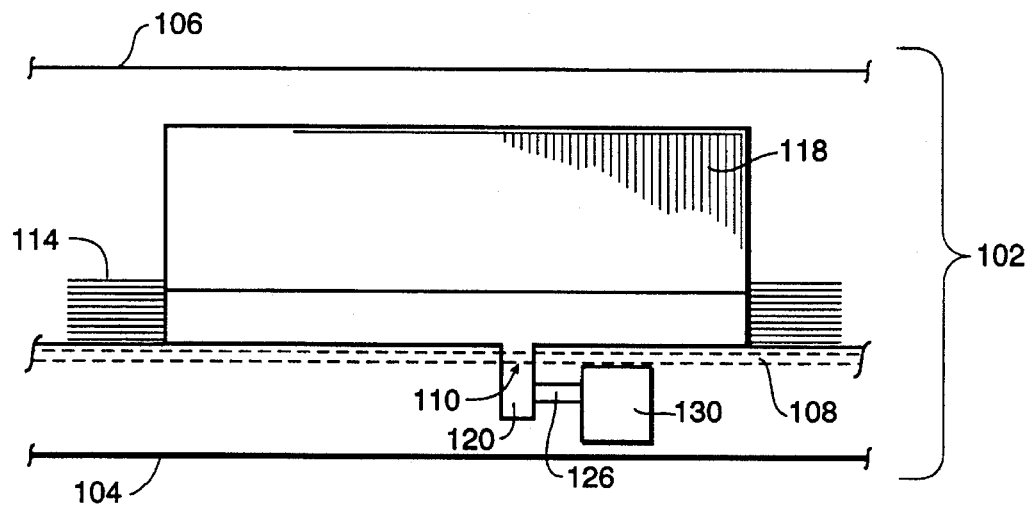
FIG. 1 is a simplified, schematic detail, plan view (side) of a portion of a print media holding apparatus in accordance with the present invention.
Figure 2:
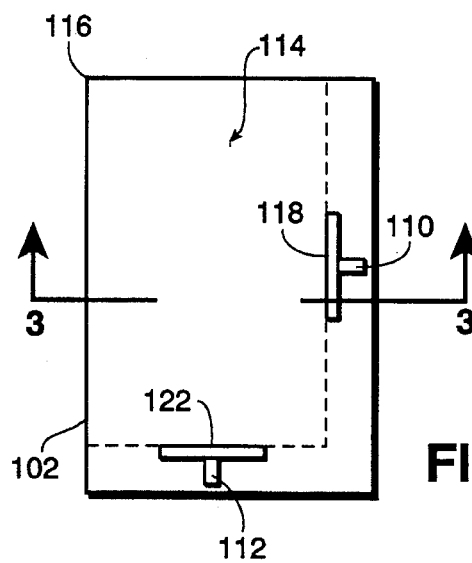
FIG. 2 is a schematic plan view (top) of a print media holding apparatus as shown in FIG. 1.
Figure 4:
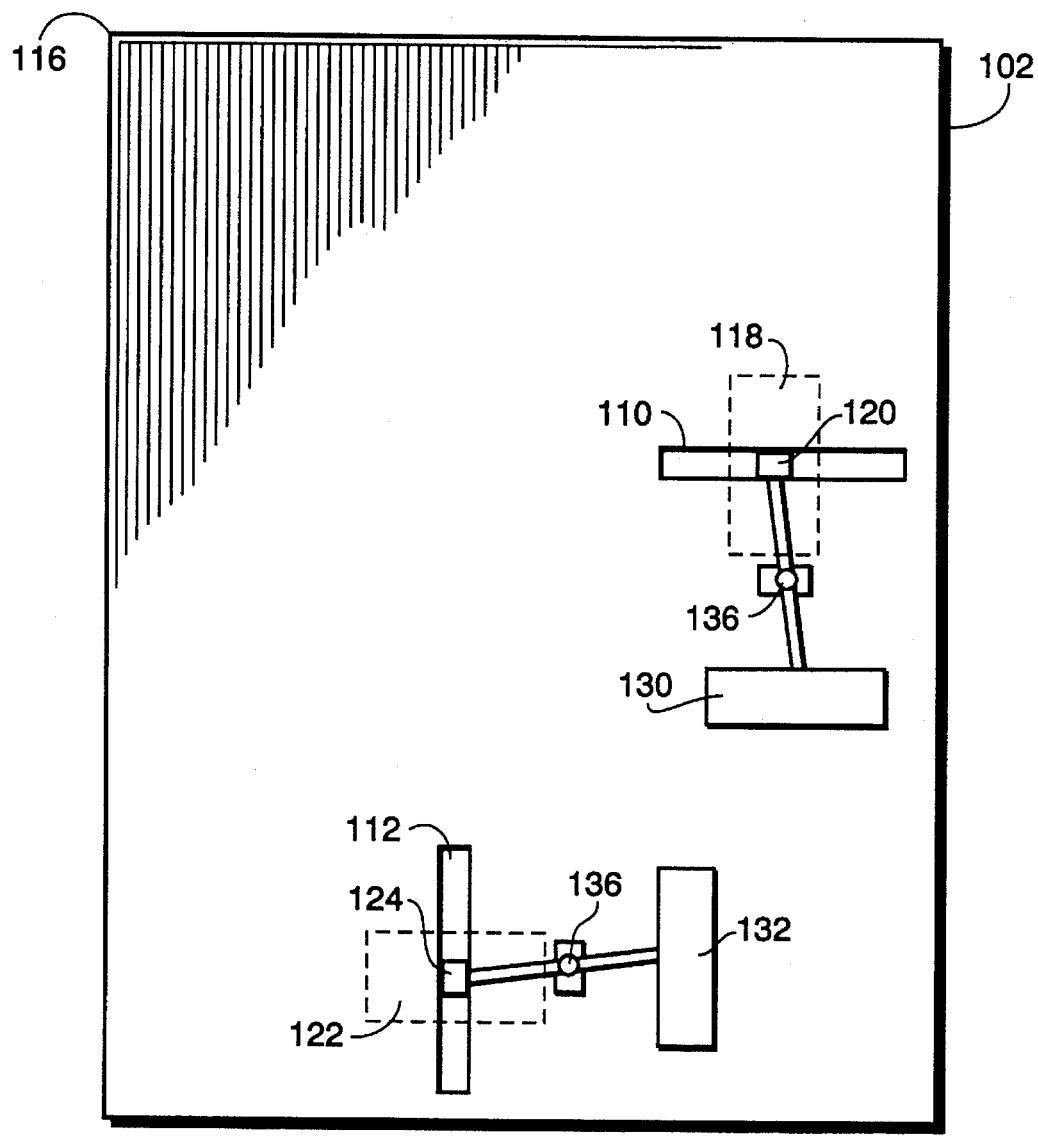
FIG. 4 is a simplified, schematic plan view (bottom) of a print media holding apparatus as shown in FIG. 1.

In FIG. 1, a section of a print media tray 102, having a bottom floor 104 and a top edge 106, is substantially a standard tray, a removable cassette, or a print media bin of a hard copy machine for holding a supply of media, such as paper, envelopes, or the like, as would be known in the art. The tray 102 may also, for example, be an internal tray of the hard copy machine itself. In accordance with the present invention, the tray 102 includes a false floor 108. Referring briefly to FIGS. 2 and 4, two slot apertures 110, 112 are provided in the false floor 108. An exemplary stack of print media 114, such as cut sheet paper, is shown specifically in FIG. 2 wherein one corner of the print media stack 114 is registered in a corner 116 of the tray 102. Fixed tray walls, reference datums, or edge separator devices (not shown) as are commonly known in the art to be used in print media supply devices are acceptable mechanisms for registering the print media stack 114 with respect to a print media pick and feed mechanism of a hard copy machine (not shown) in which the present invention is employed.

Returning to FIG. 1, a movable (manual or automated), print media alignment guide, or fence, 118 is provided for abutting at least a portion of the length of the print media stack 114. An arm portion 120 of the fence 118 extends through slot aperture 110. As shown in FIGS. 2 and 4 (in phantom lines), a similar movable fence 122 with an arm portion 124 through slot aperture 112 abuts at least a portion of the width of the print media stack 114. In other words, the print media stack 114 is held in registration to a predetermined orientation with the corner 116 of the tray (or other registration mechanism) by the movable fences 118, 122. The fences 118, 122 can be moved to a plurality of predetermined configurations along the slot apertures 110, 112 and thus can detect different predetermined print sheet alignments within the tray 102.

Figure 3:
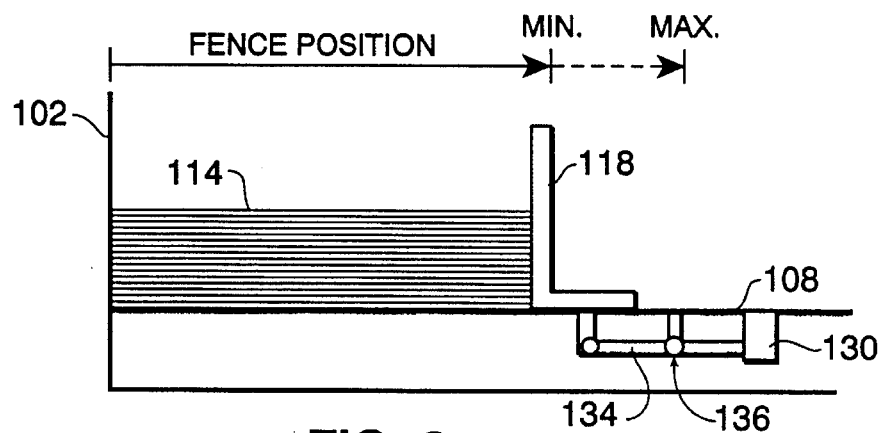
FIG. 3 is a cutaway plan view (end) of a print media holding apparatus taken along line A—A as shown in FIG. 2.

Each arm portion 120, 122 is linked to a separate potentiometer 130, 132, respectively. As best seen in FIGS. 3 and 4, each linkage 126 comprises a tie rod 134 mounted on a fixed pivot post 136. The tie rod 134 is coupled to the arm portion of the fence at one extremity and to the respective potentiometer slide at the other extremity by any suitable mechanical connector.

Each potentiometer 130, 132 is a slide potentiometer (linear); for example, the commercially available Bourns SSVA30B10300, 10K ohm potentiometer has been found to provide suitable resolution.

Via the linkage 126, as a print media fence 118, 122 is moved into a position to accommodate a particular print media size, the slide potentiometer 130, 132 is adjusted accordingly. That is, the fence position can move from a minimum print media width (or length) position, "MIN," to a maximum print media width (or length) position, "MAX," and change the potentiometer electrical output setting accordingly.

Figure 5A:
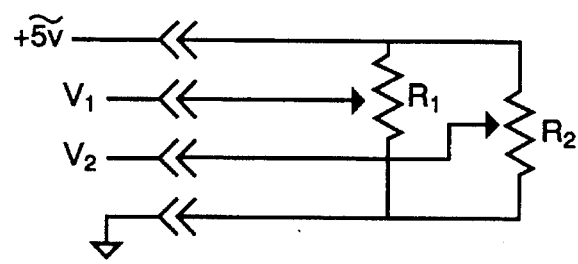
FIG. 5A, incorporating Table 1 and Table 2, is a schematic diagram of an electrical signal generating device in accordance with the present invention as shown in FIG. 1.

Referring now to FIG. 5A, an exemplary electrical schematic is provided. The potentiometers R1 and R2 are coupled via a suitable connector to a electrical power supply, designated +5 V, and grounded appropriately. The power supply can be provided or, more economically, the tray 102 can be provided with an electrical connector (not shown) for connection to a suitable power supply of the hard copy machine. The respective output voltages of the potentiometers' taps are designated $V_1$ and $V_2$. The output is similarly connected via an electrical connector to an appropriate print engine electronic controller (not shown) of the hard copy machine.

The operation and position of the two print media fences 118, 122 are independent. As an exemplary embodiment, assume the width print media fence 118 has a motion range of nine to fourteen inches and the length print media fence 122 has a motion range of ten to 20 inches. Potentiometer 130, R1, will have an output based on position as shown in Table 1. Potentiometer 132, R2, will have an output based on position as shown in Table 2. The voltage output varies linearly with the position of the print media fence. Output voltages $V_1$ and $V_2$ can be measured and used accordingly by the print engine using a microprocessor and analog/digital ("A/D") converter, wherein, for example, a ROM (read only memory) table can be used to store a voltage to paper dimension correlation look-up table.

TABLE 1

| POSITION FENCE #1 | $R_1$ | $V_1$ |
|---|---|---|
| 9.0" | 0K | 0.0 |
| 10.0" | 2K | 1.0 |
| 11.0" | 4K | 2.0 |
| 12.0" | 6K | 3.0 |
| 13.0" | 8K | 4.0 |
| 14.0" | 10K | 5.0 |

TABLE 2

| POSITION FENCE #2 | $R_2$ | $V_2$ |
|---|---|---|
| 10.0" | 0K | 0.0 |
| 11.0" | 1K | 0.5 |
| 12.0" | 2K | 1.0 |
| 13.0" | 3K | 1.5 |
| 14.0" | 4K | 2.0 |
| 15.0" | 5K | 2.5 |
| 16.0" | 6K | 3.0 |
| 17.0" | 7K | 3.5 |
| 18.0" | 8K | 4.0 |
| 19.0" | 9K | 4.5 |
| 20.0" | 10K | 5.0 |

Figure 5B:
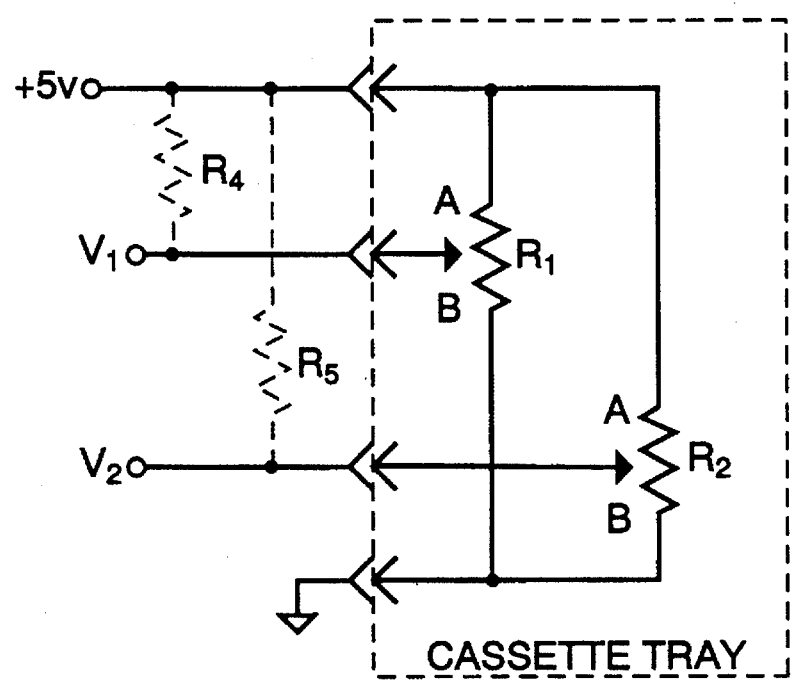
FIG. 5B, incorporating Table 1B and Table 2B, is a schematic diagram of an alternative embodiment of an electrical signal generating device as shown in FIG. 5A.

An alternative embodiment of the electrical circuit is shown in FIG. 5B. In this circuit, the dynamic range of the detection voltage, and therefore, size resolution, is reduced to allow detection of the absence of a media cassette tray, that is, that a print media supply cassette has not been installed in the hard copy machine. When the media cassette is absent, resistors $R_4$ and $R_5$ allow voltages $V_1$ and $V_2$, respectively, to measure at near five volts. These resistors may be inherent in the A/D measurement device or may be added. The values should be relatively large in comparison to $R_1$, $R_2$ and $R_3$ since they will cause coupling between the potentiometers $R_1$ and $R_2$ settings via fence positioning and the measurement voltages $V_1$ and $V_2$. Tables 1B and 2B provide exemplary measurement-indicator signal levels.

Cassette installed:

$$V_1 \approx \frac{5 \cdot R_{1b}}{R_1 \cdot R_3 \cdot R} \qquad V_2 \approx \frac{5 \cdot R_{2b}}{R_2 \cdot R_3 \cdot R}$$

-continued

WHERE: $R_1 = R_{1A} + R_{1B}$    $R_1 = 10K$ Linear
$R2 = R_{2A} + R_{2B}$    $R_2 = 10K$ Linear $$R = \left[ \frac{1}{R_1} + \frac{1}{R_2} + \frac{1}{R_3} \right] \quad R_3 = 1K$$

TABLE 1B

| POSITION FENCE #1 | $R_1$ | $V_1$ |
| --- | --- | --- |
| ABSENT | ∞ | 5.0 |
| 9.0" | 0K | 0.0 |
| 10.0" | 2K | 0.83 |
| 11.0" | 4K | 1.67 |
| 12.0" | 6K | 2.5 |
| 13.0" | 8K | 3.33 |
| 14.0" | 10K | 4.17 |

TABLE 2B

| POSITION FENCE #2 | $R_2$ | $V_2$ |
| --- | --- | --- |
| ABSENT | ∞ | 5.0 |
| 10.0" | 0K | 0.0 |
| 12.0" | 2K | 0.83 |
| 14.0" | 4K | 1.67 |
| 16.0" | 6K | 2.5 |
| 18.0" | 8K | 3.33 |
| 20.0" | 10K | 4.17 |

Note that with the present invention, a print media supply cassette can be universal for many hard copy machines, accepting any size print media in a continuous range which will fit within a particular cassette. The size of the print media is then determined by the print engine which accepts the print media supply cassette by measuring the media through the appropriate setting of the print media dimension sensor fences. This scheme also allows custom sized print media to be used in the cassette to be handled by the hard copy machine in the same manner as standard sized media without requiring special procedures. As will be recognized by those skilled in the art, this allows a "soft" solution to print media size support by the print engine; that is, the same print media cassette can be used for various print engines and the set of media sizes supported by the engine is determined by programmable software media size tables. Moreover, the ability to measure the print media size present in a computer printer or plotter allows feedback of this information to a host computer system for validation and automatic selection of print media and media settings, such as print region margins, tab settings, and the like.

Figure 6:
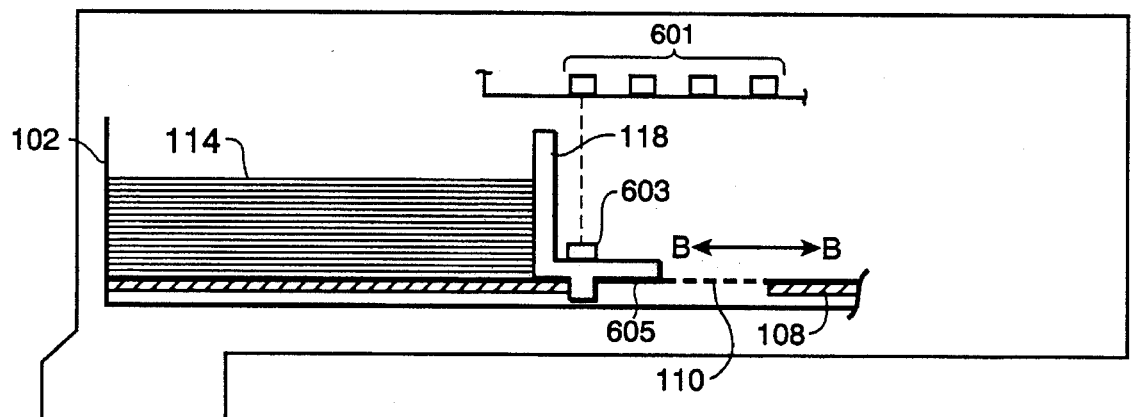
FIG. 6 is a simplified, schematic plan view (side) of an alternative embodiment in accordance with the present invention.

In an alternative embodiment as depicted in FIG. 6, no electrical connection to the print media tray 102 is required. An array of photoemitters and photodetectors is used to determined the positions of the print media fences. Commercially available parts such as the Digikey LT102B-ND infrared LED emitter and Digikey LT1030-ND photodetector can be used. The array 601 is suitably mounted in the print engine at positions for standard cut sheet print media. A mirror 603 is mounted appropriately on a extension member 605 of the print media fence 118 parallel to the floor 108 of the tray 102. As the fence 118 is moved in adjustment to a changed dimension, as indicated by arrow B—B, a corresponding emitter-detector pair of the array 601 is activated and an appropriate signal generated to designate the relative dimension of the print media in the tray 102. In other words, the mirror 603 on the print media alignment fence extension member 605 is positioned such that a particular emitter-detector pair is activated by light reflected from the mirror 603 when the movable print media fence 118 is in a designated position corresponding to a known standard print media size.

Figure 7:
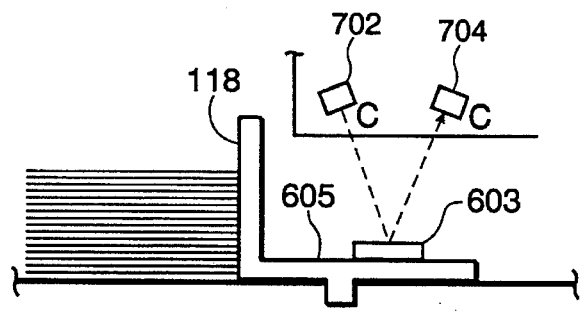
FIG. 7 is a simplified, detail schematic of another alternative embodiment in accordance with the present invention.
Figure 8:
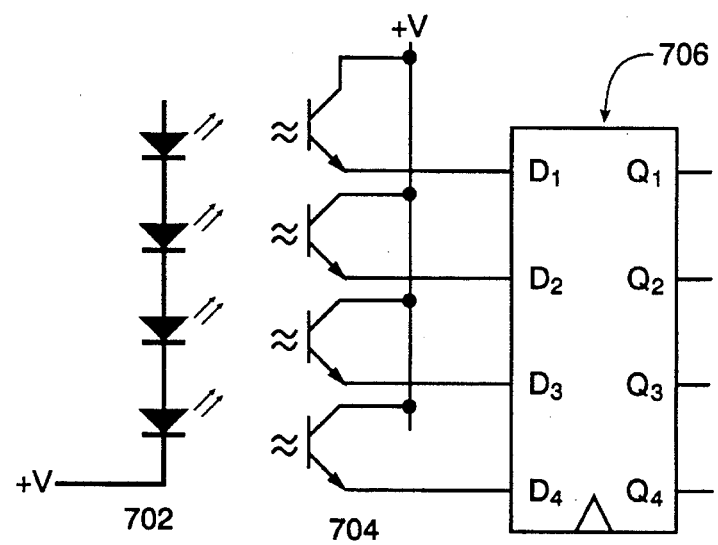
FIG. 8, incorporating Table 3, is a schematic diagram of an electrical signal generating device in accordance with the alternative embodiment of the present invention as shown in FIGS. 6 and 7.

A further alternative embodiment is shown in FIG. 7. In this embodiment, emitters 702 and detectors 704 of an array are aligned such that the print media fence position may include more variety than standard print media sizes in order that custom print media may be used. The fence 118 is again slidable with the emitters 702 and detectors 704 oriented to project and receive a beam as indicated by arrow C—C. As shown in FIG. 8, the position of the print media fence 118 can be determined by examining (e.g., with microprocessor) the state of a D-type flip-flop 706 latch (such as a 74LS175 by Texas Instruments) to determine its state. Table 3 provides an exemplary fence position to print media size correlation table.

TABLE 3

| $Q_1$ | $Q_2$ | $Q_3$ | $Q_4$ | FENCE POSITION |
| --- | --- | --- | --- | --- |
| 0 | 1 | 1 | 1 | POSITION #1 |
| 1 | 0 | 1 | 1 | POSITION #2 |
| 1 | 1 | 0 | 1 | POSITION #3 |
| 1 | 1 | 1 | 0 | POSITION #4 |
| OTHERS | | | | INVALID |

Figure 9:
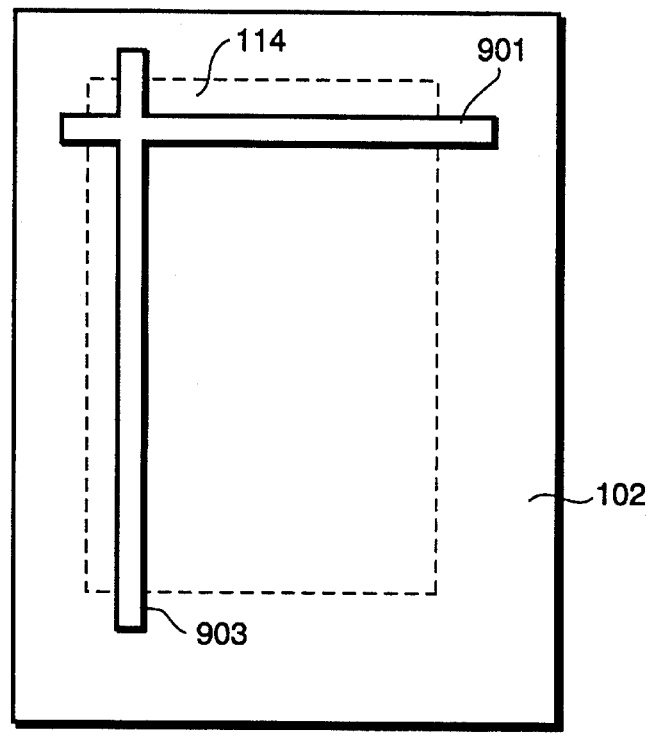
FIG. 9 is a schematic plan view (top) of another alternative embodiment in accordance with the present invention.
Figure 10:
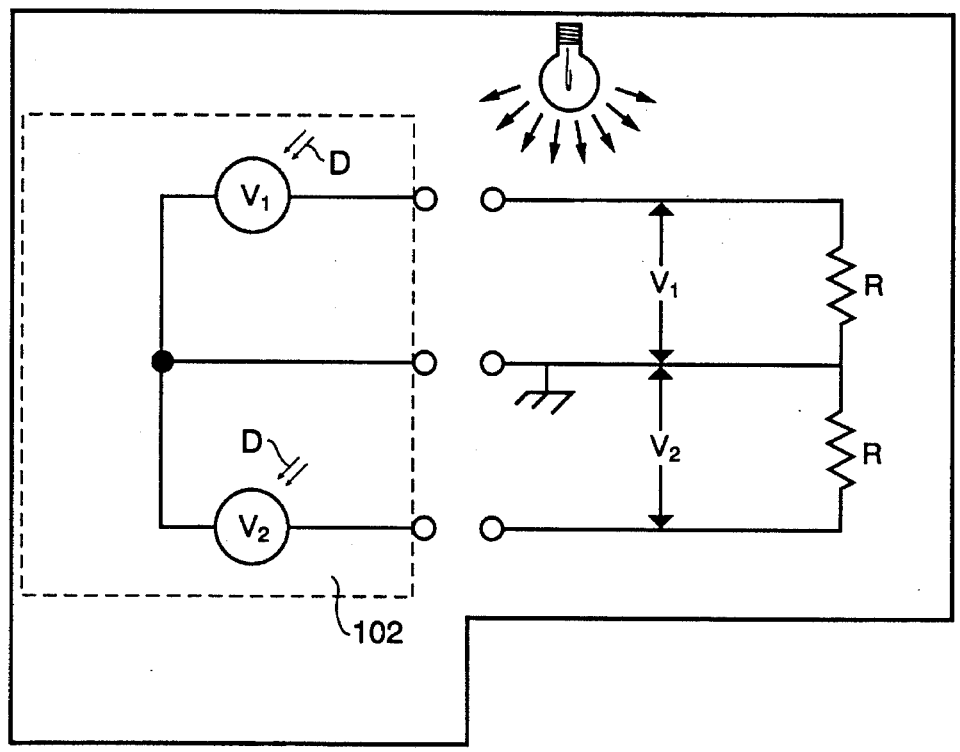
FIG. 10 is a schematic diagram of an electrical signal generating device in accordance with the alternative embodiment of the present invention as shown in FIG. 9.

Still another alternative embodiment is depicted in FIGS. 9 and 10. Print media size and, in this embodiment, presence is measured by determining the voltages $V_1$ and $V_2$ which vary proportionally to the amount of illuminated photovoltaic strips 901, 903, respectively, occluded by print media 114 in the tray 102. These photovoltaic strips are commercially available, such as model no. G39808 by Edmund Scientific. As shown in FIG. 10, light (arrows D) from a provided source 905 falls on the strips 901, 903 and thus causes the strips to provide voltage output signals that can be transformed to a print media dimensional length and width through a conversion algorithm or table. The advantage of this scheme is that it allows a nearly infinite range of print media sizes (i.e., within photovoltaic strip resolution capability) which can be determined to be present in the print media supply cassette 102. Additionally, this scheme is also valid for detecting the absence of print media in the containment holder (i.e., full scale voltage sensed) and the absence of a replaceable media supply cassette (i.e., zero voltage sensed), provided merely that the specific design allow for some portion of the strips to be not occluded for the largest acceptable print media sheet size.

Thus, it has been demonstrated that various schemes within the scope of the present invention are possible wherein adjustment of print media alignment devices in hard copy print media bins, trays, cassettes, and the like, can be used to provide a signal representative of presence of print media and the media size being held therein.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application to thereby enable others skilled in the art to understand the invention for various embodiments and with various modifications as are suited to the particular use contemplated. It is intended that the scope of the invention be defined by the claims appended hereto and their equivalents.

What is claimed is:

1. A print media detection apparatus for a hard copy machine, having a print engine, including an electrical power supply means and electronic controller means, for printing on print media of various length and width dimensions, said apparatus comprising:

holding means for holding at least one sheet of print media, including at least one registration means for fixing said sheet of print media to a predetermined orientation, and aligning means, adjustable to conform to length and width dimensions of said sheet of print media, for aligning said sheet of print media to said registration means such that said aligning means is correspondingly at a one of a plurality of predetermined configurations;

signal generating means, operable in cooperation with said holding means, for generating output signals indicative of the length and width dimensions of said sheet of print media; and means, connected to said signal generating means and said print engine, for transmitting signals to said electronic controller means such that said print engine is adjusted to produce a hard copy in accordance with length and width dimensions of said sheet of print media.

2. The apparatus as set forth in claim 1, further comprising:

said signal generating means output signals include signals indicative of the presence or absence of said sheet of print media.

3. The apparatus as set forth in claim 1, wherein said means for transmitting signals to said print engine further comprises:

a memory device for containing a print media size table correlating said signal generating means output signals to print media size information and transmitting said print media size information to said electronic controller means.

4. The apparatus as set forth in claim 1, wherein said aligning means comprises:

a first guide member selectively movable to positions of continuous adjustment to the width of said sheet of print media; and a second guide member selectively movable to positions of continuous adjustment to the length of said sheet of print media.

5. The apparatus as set forth in claim 4, wherein said signal generating means comprises:

first means, operable in cooperation with said first guide member, for generating an electrical signal indicative of the width of said sheet of print media; and second means, operable in cooperation with said second guide member, for generating an electrical signal indicative of the length of said sheet of print media.

6. The apparatus as set forth in claim 5, wherein said first and second means for generating an electrical signal each comprise:

a slide potentiometer connected to said electrical power supply means and to a respective guide member such that movement of said respective guide member changes an output signal of its respective potentiometer, such that said output signal is indicative of a linear size dimension of said sheet of print media.

7. The apparatus as set forth in claim 5, wherein said first and second means for generating an electrical signal each comprise:

an array of photoemitters and photodetectors, connected to said electrical power supply means, mounted on said print engine in a fixed orientation with respect to said registration means; and a mirror mounted on said aligning means to cooperate with said array to activate one of said photodetectors based upon the position of said aligning means, such that said activated photodetector provides a signal indicative of a size dimension of said sheet of print media.

8. The apparatus as set forth in claim 5, wherein said first and second means for generating an electrical signal each comprise:

an illuminated, photovoltaic cell array adapted to be at least partially covered by said sheet of print media such that an output signal of said photovoltaic cell array is indicative of a dimension of said sheet of print media.

9. The apparatus as set forth in claim 8, wherein a predetermined output signal of said photovoltaic cell array is indicative of the absence of either a sheet of print media or said holdings means.

10. An apparatus for detecting the dimensions of cut sheet print media held as a supply of print media for a hard copy machine in a holding means, having a means for registering said cut sheet print media to a predetermined orientation within said holding means, wherein said hard copy machine includes an electrical power supply and an electronic controller, said apparatus comprising:

first adjustable means coupled to said holding means for aligning with a first area linear dimension of said cut sheet print media;

second adjustable means coupled to said holding means for aligning with a second area linear dimension of said cut sheet print media;

first signal generating means connected to said first adjustable means for providing a first signal correlated to said first area linear dimension to said electronic controller; and second signal generating means connected to said second adjustable means for providing a second signal correlated to said second area linear dimension to said electronic controller; and means, connected to at least one of said signal generating means, for transmitting signals to said electronic controller such that said print engine is adjusted to produce a hard copy in accordance with length and width dimensions of said cut sheet print media.

11. The apparatus as set forth in claim 10, wherein said first adjustable means comprises:

a first fence member, for abutting at least a portion of a width dimension of said supply of print media, having a selective bidirectional motion range substantially perpendicular to said width of said supply of print media.

12. The apparatus as set forth in claim 11, wherein said second adjustable means comprises:

a second fence member, for abutting at least a portion of a length dimension of said supply of print media, having a selective bidirectional motion range substantially parallel to said length of said supply of print media.

13. The apparatus as set forth in claim 12, wherein said first signal generating means comprises:

a first slide potentiometer providing an output signal linearly proportional to the position of said first fence member with respect to said holding means, indicative of the width of said supply of print media.

14. The apparatus as set forth in claim 13, wherein said second signal generating means comprises:

a second slide potentiometer providing an output signal linearly proportional to the position of said second fence member with respect to said holding means, indicative of the length of said supply of print media.

15. The apparatus as set forth in claim 10, wherein said first and second signal generating means comprise:

a mirror, fixedly mounted on said first and second adjustable means, respectively; and a photoemitter and photodetector array, fixedly mounted to said hard copy machine with respect to said holding means such that motion of said first and second adjustable means and respective mirrors activates different pairs of said photoemitters and photodetectors wherein each photodetector of said array provides a signal indicative of a different area linear dimension of said supply of print media.

16. In a hard copy producing machine, having a means for holding a supply of cut sheet print media, an apparatus for detecting area dimensions of a cut sheet of print media, comprising:

a light source;

a first photovoltaic strip mounted within said holding means to be illuminated by said light source, said first photovoltaic strip having a length dimension greater than a maximum width of said cut sheet print media and being oriented in a plane parallel to the width dimension of said supply of cut sheet print media; and a second photovoltaic strip mounted within said holding means to be illuminated by said light source, said second photovoltaic strip having a length greater than a maximum length of said cut sheet print media and being oriented in a plane parallel to the length dimension of said supply of cut sheet print media, such that said cut sheet print media in said holding means covers said first and second photovoltaic strips to the extent of its width and length dimensions, such that output signals of said first and second photovoltaic strips are indicative of the width and length dimensions of said cut sheet print media in said holding means.

17. A print media supply apparatus for holding a stack of cut sheet print media and having media parameter detection capability, comprising:

a print media containment bin having a print media registration mechanism;

a first alignment device, cooperable with said bin, for relative motion with respect to said registration mechanism so as to define a width dimension of said stack;

a second alignment device, cooperable with said bin, for relative motion with respect to said registration mechanism so as to define a length dimension of said stack;

a first detector, cooperable with said first alignment device, for detecting the width of said stack and generating a first signal correlated to the relative position of said second alignment device with respect to said registration mechanism;

a second detector, cooperable with said second alignment device, for detecting the length of said stack and generating a second signal correlated to the relative position of said second alignment device with respect to said registration mechanism; and means, connected to said first detector and said second detector, for receiving each of said first and second signals and transmitting cut sheet print media dimensions based upon said first and second signals and a third signal indicative of a presence or absence of media in said apparatus.

* * * * *